Nov. 10, 1959  A. DILLENBURGER  2,912,069
NOISELESS PISTON DEVICE
Filed Dec. 19, 1956

INVENTOR:
Albert Dillenburger

BY Connolly and Hutz

ATTORNEYS

United States Patent Office 2,912,069
Patented Nov. 10, 1959

2,912,069

NOISELESS PISTON DEVICE

Albert Dillenburger, Koblenz-Luetzel, Germany, assignor to Procedo G.m.b.H., Zurich, Switzerland, a corporation of Switzerland Application December 19, 1956, Serial No. 629,259

Claims priority, application Germany December 21, 1955

8 Claims. (Cl. 188—88)

This invention relates to fluid pressure type shock absorbers, and it particularly relates to the damping pistons used in such shock absorbers and which are adapted to prevent vibrations and shocks without the necessity of using any additional valve structure.

As is well known, shock absorber damping pistons are generally constructed of rigid material. Consequently, it is necessary to use high- and low-spring pressure valves which act to oppose the direction of flow of the fluid in order to cushion the shocks. Such shock absorbers are used especially in motor vehicles, where they act as connecting means between the axle and the frame to dampen the shocks and vibrations which result from movement of the vehicle over bumps in the road, such shocks and vibrations being transferred to the wheels and carried from there to the frame.

The high- and low-pressure valves are generally constructed of metal and are arranged on the piston head within the shock absorber. These valves rapidly open and close with a clapping noise, the rapidity of such opening and closing depending on the speed of travel of the vehicle. Between the opening and closing of the valves, there is an interval during which the shock absorber fluid is denied access through the piston and, therefore, makes impact thereagainst. This, in addition to the impact of the metal valves against their metal seats, causes a large amount of knocking which is audible within the vehicle. This knocking tends to distract and to tire the driver, especially in traffic.

It is one object of the present invention to obviate the above disadvantages by substantially eliminating any knocking in the shock absorber mechanism.

Another object of the present invention is to eliminate the use of metallic valves in conjunction with the shock absorber mechanism.

Figure 1:
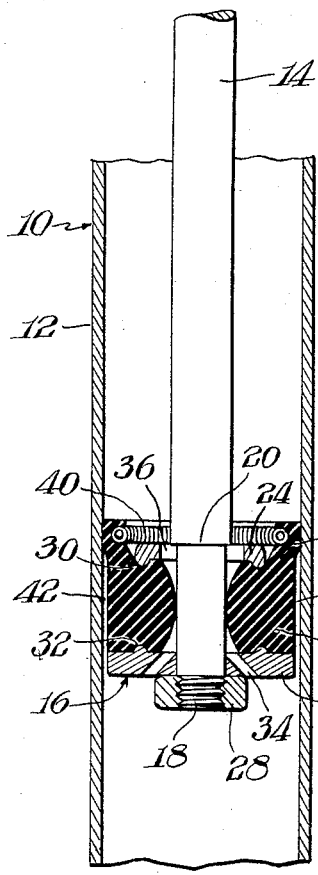
Figure 2:
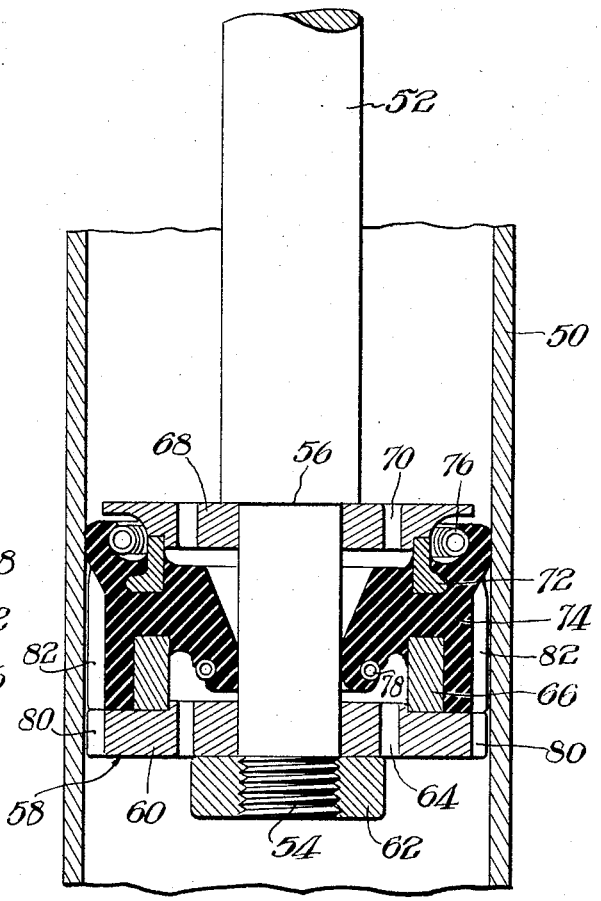

Other objects and many of the attendant advantages of this invention will be readily appreciated as the same becomes better understood by reference to the following detailed description when considered in connection with the accompanying drawings wherein:

Fig. 1 is a longitudinal view, partly in section and partly in elevation, of a shock absorber construction embodying the present invention, and Fig. 2 is a longitudinal view, partly in section and partly in elevation, of an alternate embodiment of the present invention.

Broadly speaking, the present invention resides in the construction of a shock absorber mechanism wherein the damping piston structure includes resilient, oil and heat-resistant, ring-shaped members which act to throttle the damping fluid as it passes through the piston. Such throttling action eliminates the necessity for using additional valve mechanisms.

Referring now in greater detail to the figures of the drawing wherein similar reference characters refer to similar parts, there is shown a shock absorber construction, generally designated 10, which comprises a housing 12 in which is positioned a piston rod 14 provided with a piston head, generally designated 16 at one end thereof; this piston head being positioned on a reduced portion 18, defined by a shoulder 20.

The piston head 16, itself, comprises a lower disc 22 and an upper disc 24. Both of these discs are centrally apertured to receive the reduced portion 18 of the piston rod 14 and are spaced from each other by a ring 26, constructed of a resilient, oil and heat-resistant, material, such as natural or synthetic rubber, or the like. The disc 22 acts as the supporting means and is retained on the reduced portion 18 of the piston rod by a nut 28 threadedly engaged with the lower end of the reduced portion 18; while the upper disc 24 abuts the shoulder 20 and acts as the retaining member for the resilient ring 26. The disc 24 is provided with a downwardly extending peripheral flange 30 positioned tightly against the upper portion of the resilient ring 26, while the lower disc 22 is provided with an upwardly extending flange or rib 32 on its upper surface; this rib impinging tightly against the lower portion of the resilient ring. As a result, the downwardly extending force of the flange 30 and the upwardly extending force of the rib 32 act to squeeze the middle portion of the ring radially inwardly against the reduced portion 18 of the piston rod.

Inwardly and upwardly inclined ports 34 are provided on the lower disc 22 and straight, vertical ports or grooves 36 are provided on the upper disc 24. These ports are aligned with the central aperture of the ring 26 so that when fluid, under sufficient pressure to push back the resiliently-biased middle portion of the ring, flows through the piston head, it will have passage means through these ports.

The upper portion of the ring 26 is provided with an upstanding peripheral flange 38. This flange is resiliently urged against the internal wall of the housing 12 by a ring-shaped spring 40 encircling the rod 14 and seated within the confines of the peripheral flange 38. The flange 38 is defined at its lower outer end by a series of grooves 42 positioned around the outer periphery of the ring 26, below the flange 38. These grooves 42 act as ports to permit passage of the fluid around the outside of the ring; the flange 38 acting as a diaphragm valve to regulate the upward passage of this fluid.

The operation of the above-described device is as follows:

When the piston rod 14 is moved in the upward direction, as indicated in Fig. 1, the fluid flows through the vertical ports 36, pushes back the resilient middle section of the ring 26, during which time its flow is greatly throttled, resulting in high-pressure damping, and then passes through the ports 34 at the lower end of the piston head. When the piston is moved in the opposite direction, the pressure fluid entering ports 34 will not push back the ring 26 since the direction of flow through the inclined ports 34 is against the piston rod. However, the pressure fluid does flow through the grooves 42 and pushes back the flange 38, which here acts as a diaphragm. The flange 38 in this manner also exerts a throttling action on the upwardly moving fluid so that a low-pressure damping effect is obtained.

An alternate embodiment of the present invention is shown in Fig. 2 where a housing 50 is provided with a piston rod 52 having a reduced portion 54 at its lower end, the reduced portion 54 being separated from the remainder of the piston rod by a shoulder 56. A piston head, generally designated 58, is positioned on the reduced portion 54 and comprises a lower disc 60 which is centrally apertured to receive the reduced portion 54. This disc 60 is retained on the rod by a nut 62 in threaded engagement with the lower end of the reduced portion 54. The disc 60 is provided with straight, vertical ports 64 around the apertured central portion thereof. At its outer portion, the upper face of the disc 60 is recessed to receive the lower end of a spacer ring 66.

The upper portion of the piston head comprises a centrally apertured disc 68 which encircles the reduced lower portion 54 of the rod and abuts the shoulder 56. The disc 68 is also provided with a plurality of straight, vertical ports 70 around its apertured central portion. The outer peripheral edge of the upper disc 68 is provided with a stepped configuration on its lower surface whereby a relatively shallow recess is provided inwardly and a deeper recess is provided outwardly thereof. The inner recess receives the upper end of a spacer ring 72 which is axially spaced from the lower spacer ring 66.

Between the lower and upper discs 60 and 68, there is provided a sleeve 74, of flexible material. This sleeve 74, at its outer edge, is positioned between the upper face of the disc 60 and the outer recess formed by the stepped configuration of the upper disc 68. The sleeve 74 is also provided with a reduced central portion which is retained between the lower and upper spacer rings 66 and 72. The inner portion of the sleeve is cup-shaped and is provided with a central aperture to receive the reduced portion 54 of the piston rod.

A recess is provided at the upper portion of the sleeve 74 outwardly of the spacer ring 72, and in this recess is positioned a ring-shaped spring 76 which acts to resiliently urge the upper portion of the sleeve 74 against the internal wall of the housing 50. In somewhat the same manner, a ring-shaped spring 78 is provided around the lower end of the cup-shaped inner portion of the sleeve 74, and this spring acts to resiliently urge this portion of the sleeve against the reduced portion 54 of the piston rod.

A plurality of grooves 80 is provided around the outer periphery of the disc 60, and these grooves 80 mate with corresponding grooves 82 on the outer periphery of the sleeve 74 below the uppermost portion thereof. The disc 68 has a diameter smaller than that of the disc 60 by an amount approximately corresponding to the width of the grooves 80.

The operation of this alternate embodiment of the invention is similar to that described above in regard to the embodiment of Fig. 1 in that when the piston is moved in an upward direction, as shown in Fig. 2, the pressure fluid will flow down through the ports 70 and into the cup-shaped inner portion of the sleeve 74, where it acts to force this portion of the sleeve away from the reduced portion 54 of the piston rod, against the resilient bias of the spring 78. This causes a substantial dissipation of energy resulting in a throttling action on the pressure fluid, and a high-pressure damping. The fluid will then flow down through the ports 64.

On the reverse movement of the piston, any of the pressure fluid that flows into ports 64 impinges against the outside of the cup-shaped portion of the sleeve 74 and forces it more tightly against the piston rod. However, the fluid will flow through the grooves 80 and 82 and will force back the upper end of the sleeve 74, which here acts as a diaphragm valve, thereby effecting a low-pressure damping.

It should be noted that the resiliency of the member 26 in Fig. 1 or 74 in Fig. 2 would be varied according to the viscosity of the pressure fluid. The resiliency of the material would depend on the type of material used. The type of material used would also depend on the required resistance to heat and to the solvent action of the pressure fluid.

Obviously many modifications and variations of the present invention are possible in the light of the above teachings. It is, therefore, to be understood that within the scope of the appended claims the invention may be practiced otherwise than as specifically described.

What is claimed is:

1. A piston device comprising a piston rod and a piston head mounted on said rod, said piston head comprising upper and lower rigid, apertured, supports surrounding said rod and a resiliently-biased body portion between said supports, said body portion having a central aperture to receive said rod, the walls of said aperture being resiliently-biased into frictional engagement with said rod, and the outer periphery of said body portion having a diaphragm portion resiliently-biased laterally outward of said body portion, there being passage means on the outer periphery of said body portion, and said diaphragm portion being biased into overlying relationship relative to said passage means.

2. The device of claim 1 wherein said body portion is generally ring-shaped.

3. The device of claim 1 wherein said body portion comprises a sleeve having a cup-shaped inner portion surrounding said rod.

4. The device of claim 1 wherein said body portion is constructed of resilient material.

5. The device of claim 1 wherein spring means are provided to exert a biasing action on at least a portion of said body portion.

6. A shock absorbing assembly comprising a housing, a piston movable in said housing, said piston comprising a piston rod and a piston head mounted on said piston rod, resilient rubber means in said piston head, and at least two distinct passage means formed through said piston head, each of said passage means being normally closed by portions of said rubber means, a first passage means through said piston head, a first portion of said rubber means being biased to close said first passage means, said first portion being biased against said piston rod into a closed position against fluid flow through the first passage means in a first direction and adapted to be opened by fluid flow in an opposite second direction, said first portion noiselessly contacting said piston rod, a second passage means, a second portion of said rubber means biased to close said second passage, the second portion being biased against a metal surface into a closed position against fluid flow through the second passage means in said second direction and adapted to be opened by fluid flow in said first direction, said second portion noiselessly contacting the respective metal surface.

7. A shock absorbing assembly comprising a housing, a piston movable in said housing, said piston comprising a piston rod having a piston head mounted thereon, said piston head having at least two distinct passages therethrough, each of said passage means being normally closed by a biased resilient ring in said piston head, a first passage means being a central aperture in the resilient ring on said piston head, said piston rod extending through said central aperture, a resilient element of said ring being biased into closed position against fluid flow through the first passage means in a first direction and adapted to be opened by fluid flow in an opposite second direction, a second passage means comprising at least one groove on the periphery of said resilient ring, the outer periphery of said ring being in movable contact with said housing, and the outer periphery of said ring being biased into closed position against fluid flow through the second passage means in said second direction and adapted to be opened by fluid flow in said first direction.

8. A shock absorbing assembly comprising a housing, a piston movable in said housing, said piston comprising a piston rod and a piston head mounted on said piston rod, a single, resilient unitary rubber member in said piston head, and at least two distinct passage means formed through said piston head, each of said passage means being normally closed by portions of said unitary rubber member, a first passage means through said piston head, a first portion of said unitary rubber member being biased to close said first passage means, said first portion being biased against a metal surface into a closed position against fluid flow through the first passage means in a first direction and adapted to be opened by fluid flow in an opposite second direction, said first portion noiselessly contacting said metal surface, a second passage means, a second portion of said unitary rubber member biased to close said second passage, the second portion being biased against a metal surface into a closed position against fluid flow through the second passage means in said second direction and adapted to be opened by fluid flow in said first direction, said second portion noiselessly contacting the respective metal surface.

References Cited in the file of this patent

UNITED STATES PATENTS

| | | |
|---|---|---|
| 2,507,268 | Patriquin | May 9, 1950 |
| 2,646,859 | Read et al. | July 28, 1953 |
| 2,649,936 | Crabtree | Aug. 25, 1953 |
| 2,760,603 | Ferrarotti et al. | Aug. 28, 1956 |

FOREIGN PATENTS

| | | |
|---|---|---|
| 1,077,606 | France | May 5, 1954 |
| 1,083,043 | France | June 23, 1954 |